Nov. 4, 1930.  J. R. REPLOGLE  1,780,242
VALVE
Original Filed Feb. 28, 1921
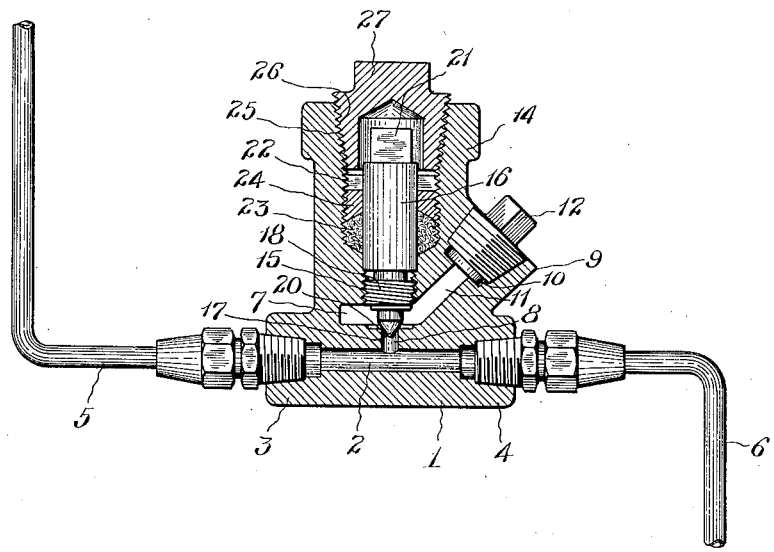

Patented Nov. 4, 1930

1,780,242

UNITED STATES PATENT OFFICE

JOHN R. REPLOGLE, OF DETROIT, MICHIGAN, ASSIGNOR TO KELVINATOR CORPORATION, OF DETROIT, MICHIGAN, A CORPORATION OF MICHIGAN

VALVE

Original application filed February 28, 1921, Serial No. 448,331. Divided and this application filed January 31, 1927. Serial No. 164,739.

This invention relates to valves, and more particularly to valves which are adapted for use in refrigerating systems. This application is a divisional of my copending application Serial No. 448,331, filed February 28, 1921.

An object of this invention is to provide a valve which is simple in construction, can be easily manufactured, and is highly effective in operation.

Another object of this invention is to provide an improved valve, which can be incorporated in a refrigerating system, and can be used in various ways to charge portions of the system with suitable fluid and is so constructed that no fluid will be lost from the system thereby.

Another object is to provide a valve having an improved packing and sealing means for the valve stem such that the escape of liquid along the valve stem is prevented all times.

Other objects more or less incidental or ancillary to the foregoing will appear from an examination of the following description taken in connection with accompanying drawings in which:

The single figure shown is a transverse sectional view of my device.

The specific application of the device shown is that of a charging valve for a refrigerating system. The device comprises a body portion 1 having a passage 2 therethrough for the circulation of fluid. The body portion 1 has tubular extensions 3 and 4 formed thereon. The interior of these tubular extensions 3 and 4 are in communication with the passage 2 in the body portion 1. Each of these extensions is connected by any suitable means to pipes 5 and 6. These pipes may contain a fluid which is adapted to circulate therethrough and constitute a working part of the refrigerating system. A recess or chamber 7 is formed in the interior of the body portion 1 and is in communication with the passage 2 by means of an auxiliary passage or restricted opening 8. The body portion 1 has a tubular extension 9 formed thereon which has an aperture 10 therein which is in communication with the recess 7 by means of a passage 11. This aperture 10 in the extension is adapted to be closed by means of a tapered screw threaded plug 12.

A second tubular extension 14 is formed on the body portion 1 and communicates with the recess 7 in the interior of the body portion 1 by means of a screw threaded opening 15 formed in the body portion 1. The stem 16 of a needle valve 17 extends through this opening 15 and has screw threads 18 formed thereon to engage the threads in this opening. The needle valve 17 seats in the upper end 20 of the auxiliary passage or restricted opening 8, and is adapted to control the flow of fluid between the passage 2 and the recess 7. The upper end 21 of the valve stem 16 is squared for the reception of a tool or the like for turning the valve stem so as to seat and unseat the valve. The extension 14 has an enlarged screw threaded passage 22 therethrough which is a continuation of the screw threaded opening 15 in the body portion 1.

A packing means 23 for the valve stem 16 is placed around the same and is secured in place by means of a gland nut 24 which engages the screw threaded walls of the passage 22. The outer end of this screw threaded passage terminates in a tapered screw threaded portion 25 which is adapted to receive a corresponding screw threaded tapered portion 26 of a plug 27, thereby providing an absolutely air tight closure between the atmosphere and the interior of the extension 14.

The body portion 1, and extensions 3, 4, 9 and 14 may be formed in a one piece casting as shown.

When it is desired that the system should be charged, the plug 12, is unscrewed from the tubular extension 9 and the nozzle of a charging apparatus (not shown) is secured to the extension. The plug 27 is then removed and the needle valve 17 is opened by means of some suitable tool engaging the squared end portion 21 of the valve stem 16. As is customary in the charging operation, the air in the system to be charged is first exhausted therefrom and then the system is charged with some suitable fluid. After the charging operation has been completed, the needle valve is again closed, the charging apparatus removed, and the plugs 12 and 27 secured in position.

It will be readily seen that the needle valve constitutes a cut-off valve between the aperture 10 in the extension 9 and the passage 2 while the charging apparatus is operatively connected to the valve structure. It will thus be seen that in the broader aspects of my invention it is not necessary that the device shown and described be limited to a charging valve as any other suitable conduit can be secured to the extension 9 and the needle valve act as a cut-off between this conduit and the passage 2.

In the application of my device it is obvious that it can be used in various ways. Thus, the pipes 5 and 6 might be the ordinary pipes for circulating the working fluid in a closed refrigerating system, or on the other hand, these pipes might be the pipes which connect a fluid operated thermostat with a sylphon control means for a motor switch. In fact, the device in question has numerous applications which will be apparent to those skilled in the art.

The packing means and gland nut provide a particularly effective fluid tight joint between the extension and the valve stem. The packing gland is adequate during the brief intervals when the plug 27 must be removed to give access to the valve stem, and when the plug is replaced and screwed home, its tapered form provides an absolutely tight closure. The double seal thus formed by the packing and plug adequately prevents leakage around the valve stem under all conditions. Thus, while the seated valve is normally interposed between the working fluid and the valve packing, in case of leakage past the valve the double seal referred to effectively prevents loss of fluid.

While I have shown and described in some detail the preferred construction and preferred arrangement of the parts, it will be understood that in all respects there can be wide variations without departing from the invention as defined in the appended claims.

What I claim as my invention is:

1. A valve fitting for refrigerating systems comprising a single piece casting provided with an outlet adapted to be secured to the inlet port of a refrigerating system, an intake tubular portion adapted to receive the return pipe of said system, said casting being provided with a circulation passage communicating with said outlet and intake connections, a tubular extension formed integral with said casting and communicating with said circulation passage, said extension being adapted to be connected to an exhausting and charging apparatus, and a manipulative valve for controlling the communication between said exhausting and charging extension and said circulation passage, said valve being arranged exteriorly of said circulation passage.

2. A valve fitting for refrigerating systems comprising a casting provided with integral inlet and outlet connections adapted to be connected with the respective terminals of a refrigerating system, there being a circulation chamber formed in said casting communicating with said connections, a tubular extension projecting laterally from said casting and adapted to be connected to a charging apparatus, a valve controlled bore connecting said charging extension with said chamber, said valve being arranged exteriorly of said chamber.

3. A valve fitting for refrigerating systems comprising a single piece casting having a body portion formed with a circulation passage and having inlet and outlet extensions communicating with said circulation passage and adapted to be connected to the respective terminals of a refrigerating system, and a tubular charging and exhausting extension, and a valve-controlled bore connecting the circulation passage and said charging and exhausting extension, said valve being arranged interiorly of said extension and exteriorly of said passage.

4. A charging, exhausting, and circulating refrigeration fitting comprising a casting provided with an integral circulation passage and a tubular charging and exhausting extension, and a valve-controlled bore connecting the circulation passage with said charging and exhausting extension, said valve being arranged interiorly of said extension and exteriorly of said passage.

5. A charging, exhausting, and circulating refrigeration fitting comprising a casting provided with an integral circulation passage and a plurality of tubular extensions, one of which is adapted to be connected to a charging and exhausting device, and a valve-controlled bore connecting said circulation passage and said charging and exhausting extension, said valve being arranged interiorly of said casting and exteriorly of said passage.

6. A charging, exhausting, and circulating refrigeration fitting comprising a casting provided with an integral circulation passage and a plurality of tubular extensions, one of which is adapted to be connected to a charging and exhausting device, a valve-controlled bore connecting said circulation passage and said charging and exhausting extension, and a detachable cap for sealing said charging and exhausting extension.

7. A valve mechanism comprising a body portion having a circulating passage therethrough; an integral extension formed on the said body portion and having an opening therethrough communicating at its inner end with a passageway in the said body portion, the said body portion having an auxiliary passageway therein connecting the said first named passage with the said circulating passage; a valve for controlling this auxiliary passageway having a stem extending through the body portion, said valve being arranged exteriorly of said circulating passage and the passageway in said body portion.

8. In a valve mechanism, a body portion having a main passage therethrough; an auxiliary passage communicating with said main passage at one end and opening at its other end into a central chamber; a plurality of extensions integral with said body portion and having passages therethrough communicating with the said central chamber in the said body portion; a needle valve in one of the said last named passages for closing said auxiliary passage; and a removable plug for closing the said last named passage.

9. In a charging device a body portion having a main passage therethrough and an auxiliary passage communicating with said main passage, a laterally extending projection on said body portion, said projection being provided with two passages communicating with said auxiliary passage, a needle valve in one of said last named passages for closing said auxiliary passage, and a removable plug for closing the other of said last named passages, substantially as shown and described.

10. A charging, exhausting, and circulating refrigeration fitting, comprising a body provided with a circulation passage and a plurality of extensions, one of said extensions being adapted to be connected to a charging and exhausting device, a valve-control bore connecting said circulation passage and said charging and exhausting extension, said valve being arranged exteriorly of said circulation passage, and a detachable cap for sealing said charging and exhausting extension.

In testimony whereof, I hereunto affix my signature.

JOHN R. REPLOGLE.